No. 11,785. Reissued Nov. 7, 1899.

P. F. HODGES.

FRONT CUT MOWING MACHINE.

(Application filed June 16, 1899.)

Witnesses

L. C. Hills.

Blanford & Osborne

Inventor

Pliny F. Hodges

By Whitaker & Prest Attorneys

THE NORRIS PETERS CO., PHOTO-LITHO., WASHINGTON, D. C.

UNITED STATES PATENT OFFICE.

PLINY F. HODGES, OF GOOCHLAND, VIRGINIA.

FRONT-CUT MOWING-MACHINE.

SPECIFICATION forming part of Reissued Letters Patent No. 11,785, dated November 7, 1899.

Original No. 624,334, dated May 2, 1899. Application for reissue filed June 16, 1899. Serial No. 720,819.

*To all whom it may concern:*

Be it known that I, PLINY F. HODGES, a citizen of the United States, residing at Goochland, in the county of Goochland and State of Virginia, have invented certain new and useful Improvements in Front-Cut Mowing-Machines; and I do hereby declare the following to be a full, clear, and exact description of the said invention, such as will enable others skilled in the art to which it appertains to make and use the same.

My present invention relates to front-cut mowing-machines; and it consists of certain improved constructions and combinations of parts whereby certain evils of the older constructions are avoided and improved results obtained.

In the accompanying drawings I have shown the best mode in which I have contemplated embodying my invention, and my said invention is disclosed in the following description and claims.

Figure 1:
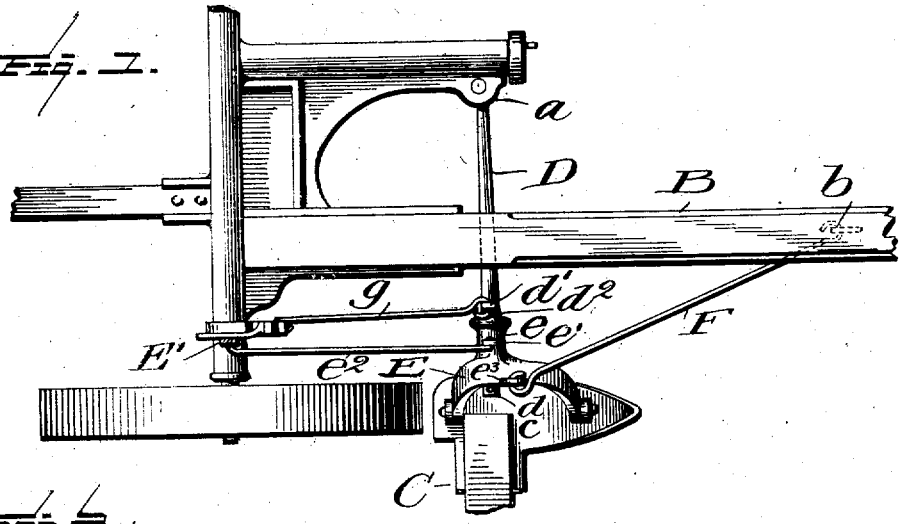
Figure 2:
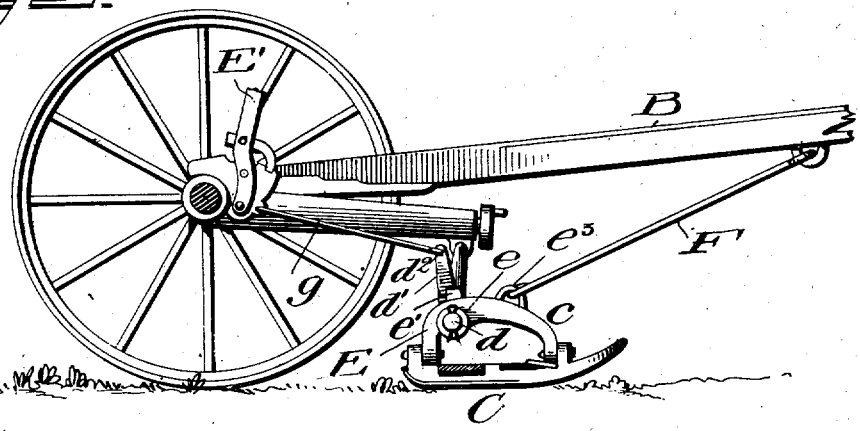
Figure 3:
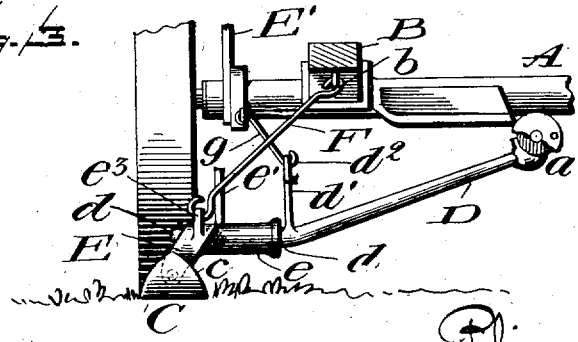

In the drawings, Figure 1 is a plan view of the truck-frame, cutting mechanism, and draft devices, the greater part of the finger-bar being broken away to permit the figures to be made on a larger scale for the better presentation of the parts shown therein. Fig. 2 is a view in elevation from the grass side, some parts being broken away; and Fig. 3 is a front elevation.

In some front-cut mowers the cutting mechanism is so attached to and connected with the truck-frame that in case of any increase of resistance to its passage through the grass the increased draft has a tendency to lift the truck-wheels, and thereby lessen their tractional power, and this oftentimes results in the clogging of the machine. In order to avoid this result and its consequent evils, machines have been constructed in which the cutting mechanism is drawn or dragged by a draft-link pivoted to the pole or tongue of the machine. In such constructions there is a device which may be termed a "coupling-brace" interposed between the finger-bar and the opposite side of the machine, and such coupling-brace is pivoted by a universal-joint connection to the frame at their point of intersection. In such cases when the inner end of the finger-bar, or the end nearest the truck-frame, rises and falls it will be moved in the arc of a circle of which the forward pivot of the draft-link is the center. The connection of the coupling-brace with the finger-bar comprises such uniting devices as to permit of a flexure at that point parallel with the line of draft, but which compel the two to move together as one on the universal connection as a pivot in any backward-and-forward movement. In consequence of this as the inner end of the finger-bar is moved out of a straight vertical line in rising and falling the combined finger-bar and coupling-brace move backward and forward on the pivotal connection with the truck-frame, causing the finger-bar to assume varying angles to the line of draft, and as the deviation from the normal line at the inner end of the finger-bar is largely increased at the outer end of the bar this is very objectionable. This objectionable feature of this construction has been overcome by my invention, the novelty of the same being directed in part to this end.

In the drawings, A is the truck-frame. B is the pole or tongue, C the finger-bar, and *c* the shoe at the inner end of the finger-bar. These may all be of any of the ordinary and well-known forms of construction.

D is what I have hereinbefore termed the "coupling-brace." This is in this instance connected to the truck-frame at *a* by a ball-and-socket joint. The main portion of this coupling-brace is normally in an inclined position, as best seen in Fig. 3; but a portion of the same *d* nearest the finger-bar extends at an angle to the main body of the coupling-brace, so that when the machine is in operative position this part of the brace which I term the "crank" will be practically horizontal.

E is the hinge-piece. This is provided with a sleeve *e*, to which the crank *d* of the coupling-brace is fitted. The finger-bar is hinged in a well-known way to the hinge-piece. This joining of the coupling-brace with the finger-bar permits the movements of the finger-bar heretofore described. The hinge-piece or sleeve E is provided with an upwardly-extending arm $e'$, which is connected by a link $e^2$ to a latch-lever E′, by which the finger-bar can be rocked or tilted. The hinge-piece is also provided with means for securing the rear end of the draft-rod pivotally thereto, and this is in this instance the eye $e^3$, and the draft-link F securely engages the same. The forward end of the draft-link is held by a staple or eye $b$ on the pole.

The coupling-brace is provided between its ends—in this instance near the sleeve—with an upwardly-extending arm $d'$. This arm is pivoted at $d^2$ to one end of a link $g$. The other end of the link is pivoted to the truck-frame or to some stationary part of the machine secured thereto. It will also be seen that the cutter-bar is wholly drawn or dragged by the draft-link and that any retardation or increased resistance to the cutter-bar will have no effect to lessen the tractional power of the truck-wheels.

It will be obvious that in assembling the parts the coupling-brace D will be turned so as to cause the crank portion $d$ to bring the cutter-bar to the desired angle with respect to the truck-frame and the line of draft, and the link $g$ will be so formed that when connected to the arm $d'$ and the truck-frame it will hold the parts in this relation. It will also be seen that should the inner shoe of the finger-bar and the hinge-piece move backward or forward the movement of the coupling-brace upon its pivotal connection with the frame would change its angular position to the line of draft; but by reason of the action of link $g$ and arm $d'$ the crank portion of the coupling-brace would be caused to roll slightly in the sleeve of the hinge-piece, thus maintaining the said crank portion and the finger-bar at a constant angle to the line of draft.

I am the first to produce a coupling-brace connected to the truck-frame at one end and having its other end provided with a crank portion formed at an angle to the main portion of the brace and sleeved to the hinge-piece, whereby the turning of the coupling-brace will cause the crank portion to control the angle of the cutter-bar with respect to the truck-frame and the line of draft, and this construction I broadly claim.

What I claim, and desire to secure by Letters Patent, is—

1. In a front-cut mowing-machine, the combination with the truck-frame and pole, the cutting mechanism, the hinge-piece and the draft-link, of the coupling-brace having one end connected to the truck-frame by a connection permitting universal movement, and provided with a crank portion at its other end, disposed at an angle to the main portion of the brace and sleeved to the hinge-piece, whereby the rolling of said coupling-brace will cause said crank portion thereof to control the angle of the cutting mechanism to the truck-frame and the line of draft, substantially as described.

2. In a front-cut mowing-machine, the combination with the truck-frame and pole, the cutting mechanism, the hinge-piece and the draft-link, of the coupling-brace, having one end connected to the truck-frame by a universal joint, and a crank portion at its other end formed at an angle to the main portion of the brace, and sleeved to the hinge-piece, an arm secured to said brace between its ends, and a connection between said arm and the truck-frame, substantially as described.

3. In a front-cut mowing-machine, the combination with the truck-frame, and pole, the cutting mechanism, the hinge-piece and the draft-link, of the coupling-brace, having one end connected to the truck-frame by a universal joint and a crank portion at its other end formed at an angle to the main portion of the brace and sleeved to the hinge-piece, an arm secured to said brace between its ends and a link connecting said arm to the truck-frame, substantially as described.

In testimony whereof I affix my signature in the presence of two witnesses.

PLINY F. HODGES.

Witnesses:
L. P. WHITAKER,
J. D. KINGSBERY.